Oct. 26, 1948.  R. T. KEATING  2,452,472
COMBUSTION TUBE HEATER FOR COOKING CONTAINERS
Filed Nov. 4, 1944  2 Sheets-Sheet 2
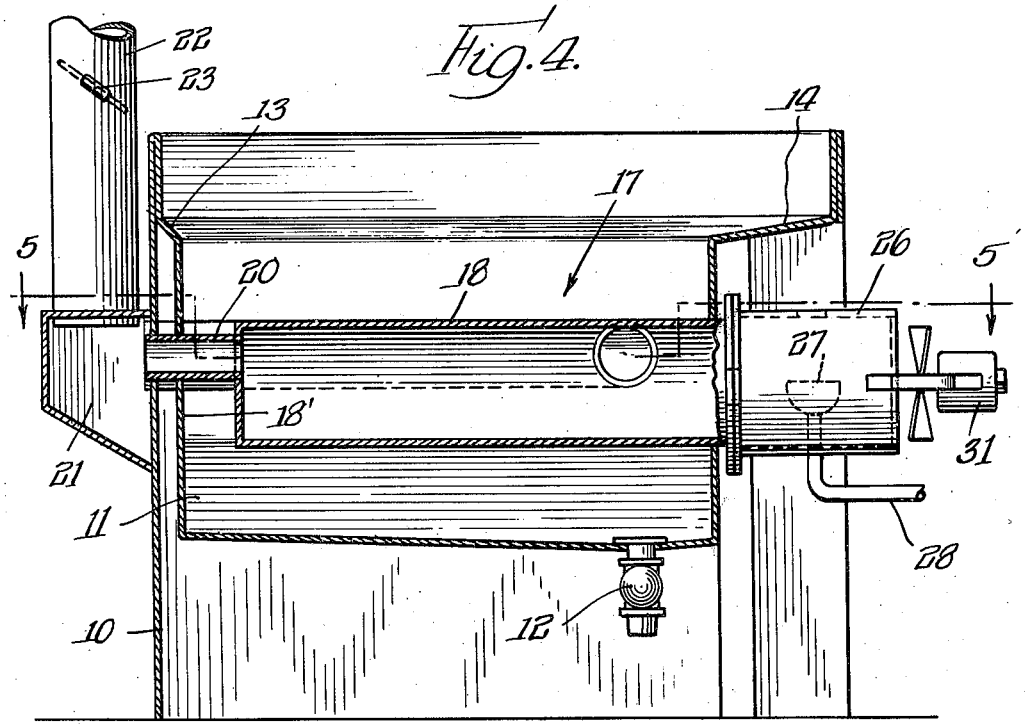
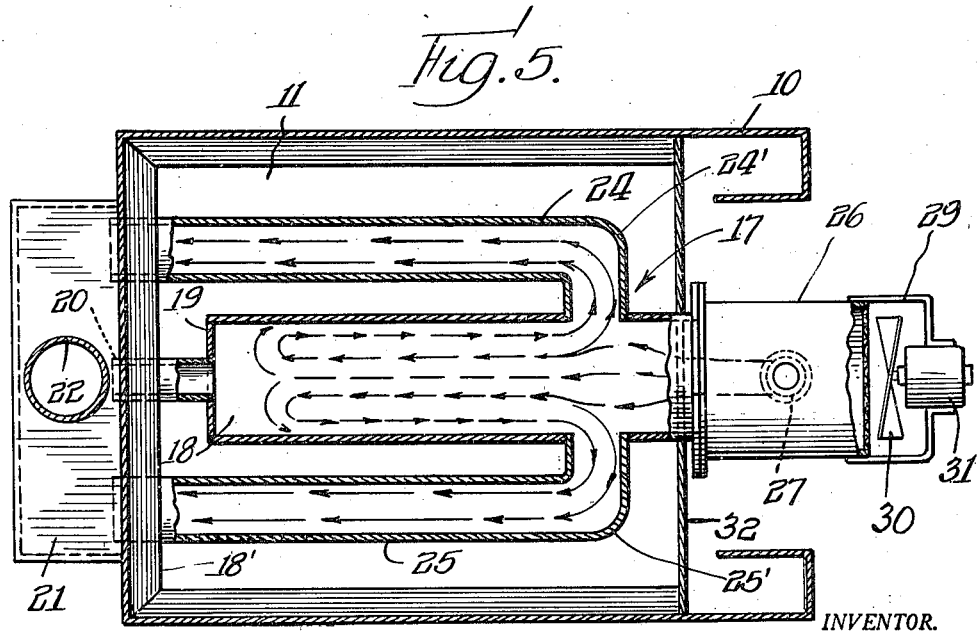
INVENTOR.
Richard T. Keating
BY
Loftus, Moore, Olson & Trexler
Attys.

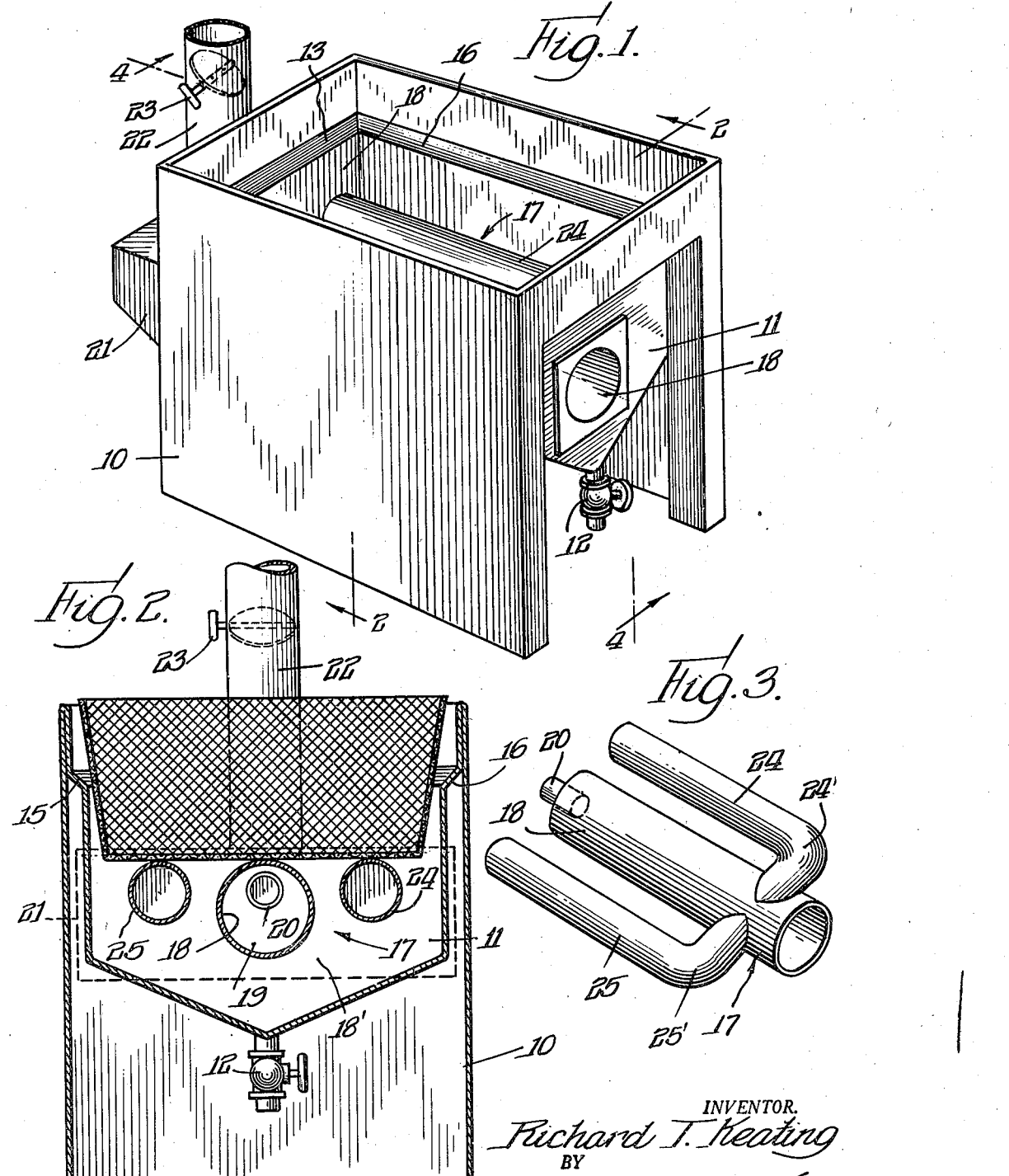

Patented Oct. 26, 1948

2,452,472

UNITED STATES PATENT OFFICE 2,452,472

COMBUSTION TUBE HEATER FOR COOKING CONTAINERS

Richard T. Keating, Oak Park, Ill.

Application November 4, 1944, Serial No. 561,851

8 Claims. (Cl. 126—391)

1

This invention relates to improvements in a combustion tube heater for cooking containers used for frying doughnuts, potatoes and other products.

It is an object of my invention to provide a deep fryer so arranged and combined as to produce from a given quantity of heating fuel a maximum of useful working heat capacity.

A further object of my invention is to provide a deep fryer with a heat distributing chamber so arranged and combined as to efficiently prevent the waste of heat-producing fuel.

It is a further object of my invention to provide a deep fryer so arranged as to efficiently utilize the heat-producing elements of the fuel before being discharged.

It is a further object of my invention to provide in a deep fryer a combustion chamber so arranged and combined with its fuel supply as to provide in operation a central longitudinally extending combustion flame extending substantially across the vat traveling in one direction, surrounded by an envelope of substantially burnt hot gases traveling in the opposite direction to minimize the deposition of carbonaceous material or soot on the inner walls of the combustion chamber.

The above and other advantages and capabilities of my invention will be apparent from a detailed description of the accompanying drawings in which I have illustrated one form of my invention, but the construction therein shown is to be understood as illustrative and not as defining the limits of my invention.

In the accompanying drawings:

Figure 1 is a perspective view of a deep fryer embodying one form of my invention;

Figure 2 is a transverse sectional view taken on the line 2—2 of Figure 1;

Figure 3 is a perspective view of my heat exchanger separate and apart from the frying vat;

Figure 4 is a vertical longitudinal sectional view on the line 4—4 of Figure 1 looking in the direction indicated by the arrow; and Figure 5 is a sectional view taken on the line 5—5 of Figure 4, also looking in the direction indicated by the arrows.

Referring to the drawings in detail, my deep fryer consists of a casing 10 rectangular in shape having side and end members constructed of suitable metal. Formed integrally with the sides and ends of the casing is a depressed metal frying vat 11. The bottom of this vat, as shown, is V-shaped in cross section and provided with a drain discharge valve 12 at its lowest point, as

2 best shown in Figure 2. The vat is provided with inwardly extending ledges 13, 14, 15 and 16 near the top of the casing so that the vat through a substantial portion of its depth is offset inwardly from the casing, the greatest offset being at the forward or burner end, leaving a substantial space around the vat, between the outer walls of the vat and the walls of the casing, forming an air chamber therebetween.

Mounted in the vat intermediate its top and bottom is an immersed heater unit 17 having a combustion chamber 18 of cylindrical form in cross section having a relatively large diameter. It is positioned directly above the apex of the V-shaped bottom. The intake end of this combustion chamber passes through an opening in the front wall 32 of the vat and is supported thereby, there being provided a suitable fluid tight connection between the intake and hot combustion chamber and the front wall of the vat. The combustion chamber extends across the vat to a point near the rear end wall 18' of the vat and is supported by the rear wall 18' by means of a relatively small tube 20, one end of which tube 20 communicates with the interior of the combustion chamber. This tube is eccentrically mounted in the circular end wall 19 of the combustion chamber, as best shown in Figure 2. The opposite end of the tube 20 passes through an opening in the rear end wall 18' of the vat and discharges into an elongated chamber 21, which chamber is rigidly fixed by any suitable means to and on the outside of the rear wall of the casing 10. The chamber 21 in turn communicates with a vertical discharge gas flue or stack 22, which stack is provided with a control valve or damper 23.

Suitably fixed to the combustion chamber near its intake end are two cylindrical heat exchangers 24 and 25 having diameters preferably substantially less than the diameter of the combustion chamber. These exchangers are spaced from the combustion chamber and are supported at their forward ends by elbows 24' and 25', respectively, which elbows are cylindrical and of the same diameter as the exchangers and provide open communication between the exchangers and combustion chamber. The exchangers are so connected with the combustion chamber that their uppermost surfaces are in a plane or level with the uppermost surface of the combustion chamber. The opposite ends of the exchangers 24 and 25 pass through suitable openings in the rear wall of the vat and the rear wall of the casing and discharge into the chamber 21. Suitable liquid tight connections are provided in such openings between the exchangers and the rear walls of the vat and casing.

Secured to the forward end of the exchanger by any suitable means, as best shown in Figures 4 and 5, is a burner housing 26. In this housing is mounted a suitable fuel burner 27 connected by a suitable conduit 28, or other means, to a supply source of fuel. The forward end of the burner housing is provided with openings. Attached to the forward end of the burner housing by any suitable means is a blower housing 29. Within this housing is mounted by any suitable means a blower 30 adapted to be driven by a suitable motor 31 or other source of power. The housing 26 connected to the intake end of the combustion chamber is preferably cylindrical in form and of the same diameter as the combustion chamber.

The burner 27 is positioned substantially at the axial center of the housing 26 and near the intake end of the combustion chamber so that when the burner is lighted and the blower put in operation a central core of flame is driven centrally through the combustion chamber toward the end wall 19, during which travel substantially most of the combustion takes place. Due to the fact that the combustion chamber at one end is closed except for the relatively small discharge opening 20, most of the flue gas is caused to travel in the combustion chamber in a direction opposite to the travel of the flame, surrounding and enveloping the traveling core of flame. The burnt gases pass out through the openings communicating with the heat exchangers, whereupon their direction of travel is reversed and they are passed entirely through the immersed heat exchangers and discharged into the chamber 21, as best shown in Figure 5. This construction, which in operation affords a central core of burning fuel or flame traveling in one direction, a surrounding or enveloping ring of burnt gases traveling in the opposite direction interposed between the walls of the combustion chamber, and the central core of burning fuel, minimizes the deposition of carbonaceous material, soot and the like on the inner walls of the combustion chamber, avoiding hot spots and greatly extending the life of the combustion chamber and the troublesome problem of frequent clean-out periods. Further, the combustion chamber provides an excellent heat exchanger due to the fact that the hot gases from the burnt fuel are caused to travel in a reverse direction from the flame in the form of a moving ring or envelope adjacent to the inner cylindrical wall of the combustion chamber. The heat produced from the flame for a given quantity of fuel is further utilized and transferred to the contents of the vat for doing useful work by virtue of the fact that after the burnt gases have traveled lengthwise of the combustion chamber in the manner above stated, they pass on into the heat exchangers and thence lengthwise through these exchangers before being discharged into the chamber 21. It will thus be seen that there is a greatly improved exchange of heat from a given amount of fuel to the contents of the vat.

In my invention the V-shaped bottom of the vat serves an important purpose in combination with my relatively large combustion chamber which is positioned directly over the apex of the V-shaped bottom as this permits the immersion of the relatively large combustion chamber in a minimum supply of fat in the vat. This is important, first, because the fat is expensive, and secondly, a smaller volume of fat is required for any given operation than would be the case if the bottom of the vat were perfectly straight. Further, the arrangement affords an additional advantage in that it provides a relatively deep volume of liquid below the combustion chamber which in practice would be termed a cold zone immediately below the combustion chamber where crumbs and the like are permitted to collect.

In the vat is a suitable wire mesh product container which extends well down into the vat and is supported on and by the combustion chamber and heat exchangers in the vat. This basket is so arranged and mounted as to be readily removed and replaced for loading and unloading the doughnuts or other products being fried.

In operation, the vat is supplied with fat or frying fluid so as to immerse not only the combustion chamber and the heat exchangers, but products in the wire mesh basket or container. The fuel in the cup 27 from which the heating fluid is discharged is ignited. The blower 30 is set in operation, which forces the burning flame of the fuel burner centrally through the cylindrical combustion chamber longitudinally in one direction. A back pressure is set up in the combustion chamber by virtue of the fact that its end is closed save for a restricted eccentric relatively small discharge flue. The hot gases produced by the burning flame, as best shown in Figure 5, travel in a longitudinal direction parallel with but in reverse direction to the travel of the flame in the form of a ring or envelope surrounding the flame and in direct contact with the inner cylindrical wall of the combustion chamber and thence outwardly into the heat exchangers 24 and 25 and thence through the heat exchangers in direct contact with the inner cylindrical walls thereof parallel with and in the same direction of travel as the flame, from which exchangers the flue gases are discharged into the chamber 21. A relatively small amount of the heated gas is discharged direct from the combustion chamber through the constricted relatively small eccentric discharge 20.

It will be seen that with my arrangement and combination the heat producing components of the fuel are efficiently utilized and put to useful work rather than being wasted and that the heat produced by any given amount of fuel is effectively exchanged or transferred from the combustion chamber and heat exchangers to the fat or frying fluid in the vat instead of the gases passing through the vat and escaping through a stack without imparting all its useful heating energy to the fat or frying fluid in the vat.

From the foregoing description it will become apparent that I have provided an apparatus which results in a great saving of fuel by preventing waste of heating energy and effectively utilizing the heat-producing components of any given amount of fuel.

Having thus described my invention, I claim:

1. A deep fryer comprising in combination a frying fluid vat, a relatively large cylindrical longitudinally extending combustion chamber mounted in and extending substantially across said vat and adapted to be immersed in frying fluid when said apparatus is in normal operation, said chamber having a flame intake at one end and its opposite end closed save for a relatively constricted outlet, said outlet being eccentrically located with respect to the axis of said chamber, flue gas discharge means near the intake end of the combustion chamber, and a pressure-operated fuel-burning device disposed adjacent the flame intake for projecting a central burning core of fuel longitudinally through said combustion chamber in one direction, said opposite end of said chamber causing a ring or envelope of burnt gases surrounding and in contact with said burning fuel to travel through said combustion chamber in the opposite direction and out said flue gas discharge means near the intake of the combustion chamber to minimize the deposition of carbon or soot in the combustion chamber.

2. A deep fryer comprising in combination a frying fluid vat, a relatively large cylindrical longitudinally extending combustion chamber mounted in and extending substantially across said vat and adapted to be immersed in frying fluid when said apparatus is in normal operation, said chamber having a flame intake at one end and its opposite end closed save for a relatively constricted outlet, flue gas discharge means near the intake end of the combustion chamber, a pressure-operated fuel-burning device disposed adjacent the flame intake for projecting a central burning core of fuel longitudinally through said combustion chamber in one direction, said opposite end of said chamber causing a ring or envelope of burnt gases surrounding and in contact with said burning fuel to travel through said combustion chamber in the opposite direction and out said flue gas discharge means near the intake of the combustion chamber to minimize the deposition of carbon or soot in the combustion chamber, and heat exchangers connected with the flue gas discharge means and extending across the vat and having their longitudinal axes spaced from and parallel with the combustion chamber through which the heated gases travel in a direction with the flame in the combustion chamber for efficiently transferring the heat from the combustion chamber and exchangers to the fluid in the vat.

3. In a deep fryer, a vat, a relatively large cylindrical combustion chamber extending across the vat having a flame intake at one end with its opposite end closed save for a constricted eccentric relatively small outlet flue, heat exchangers communicating with said combustion chamber near its intake end spaced from and extending parallel to the combustion chamber, a fuel-burner disposed adjacent said intake end for developing a flame, a blower for forcing the flame to travel centrally through the combustion chamber in one direction, said substantially closed end forcing the flue gases to travel in a reverse direction substantially through the combustion chamber in the form of a ring or envelope surrounding and in contact with the traveling flame and into the heat exchangers and through the exchangers across the vat in the same direction as the flame in the combustion chamber.

4. In a deep fryer, a vat having a bottom V-shaped in cross section, a relatively large cylindrical longitudinally extending combustion chamber mounted in said vat immediately above the apex of the V-shaped bottom, said combustion chamber having a flame intake at one end, relatively small cylindrical longitudinally extending heat exchangers communicating adjacent the intake and rigidly fixd to the combustion chamber and spaced therefrom with their upper surfaces substantially in a plane with the upper surface of the combustion chamber and so arranged as to form a support for a products container positioned in the vat, a fuel burner near the intake end of said combustion chamber, and pressure means for causing the flame to travel centrally and longitudinally through said combustion chamber in one direction, said combustion chamber having an integral member for substantially closing its end opposite said flame intake, said member causing a ring or envelope of flue gas surrounding the flame to travel through said combustion chamber in a reverse direction and through said exchangers in the same direction as the travel of the flame.

5. The combination of a combustion chamber tube and a pair of L-shaped heat-exchanger tubes communicating with the intake end of said combustion chamber tube adjacent the burner end thereof and having their main body portions extending parallel to said combustion chamber tube, a constricted relatively small outlet flue eccentrically mounted in the end of said combustion chamber tube, said combustion chamber tube having its intake end, opposite the burner end, closed, except for said constricted relatively small outlet flue.

6. A tubular combustion chamber having an open flame intake end, with its opposite end closed save for a constricted eccentric relatively small outlet flue, a pressure-operated fuel burner disposed axially of said tubular chamber and adjacent said flame intake end for projecting a central burning core of fuel longitudinally through said chamber and against said opposite end, the wall of said chamber being formed with a flue gas outlet near its flame intake end, whereby when flame is forced to travel centrally through the combustion chamber toward said closed end flue gases travel in a reverse direction substantially through the combustion chamber in the form of a ring or envelope surrounding the traveling flame and finally pass through said flue gas outlet, said flue gas outlet comprising a pair of apertures and tubular heat exchangers communicating with said chamber through said apertures and extending parallel to and spaced from said chamber in a direction toward said closed end whereby said gases pass into said exchangers and through the exchangers in the same direction as said flame.

7. In combination a housing, a burner outside of one wall thereof, a flame passage extending axially from the burner inwardly through such wall and terminating short of the opposite wall of the housing, a second flame passage generally parallel with the first, joined thereto inside the housing, adjacent the burner and extending outwardly through the opposite wall of the housing, a header outside said opposite wall into which such latter passage discharges, and a conduit extending outwardly through the wall of the housing joining the axial passage and the header, the cross-sectional area of the conduit being substantially less than the cross-sectional area of the axial passage.

8. In combination a housing, a burner outside of one wall thereof, a flame passage extending axially from the burner inwardly through such wall and terminating short of the opposite wall of the housing, a second flame passage generally parallel with the first, joined thereto inside the housing, adjacent the burner and extending outwardly through the opposite wall of the housing, a header outside said opposite wall into which such latter passage discharges, and a conduit extending outwardly through the wall of the housing joining the axial passage and the header, the cross-sectional area of the conduit being substantially less than the cross-sectional area of the axial passage, the cross-sectional area of the second passage being substantially less than the cross-sectional area of the axial passage.

RICHARD T. KEATING.

REFERENCES CITED

The following references are of record in the file of this patent:

UNITED STATES PATENTS

| Number | Name | Date |
|---|---|---|
| 350,337 | Bache | Oct. 5, 1886 |
| 575,081 | Turner | Jan. 12, 1897 |
| 1,015,261 | Bone et al. | Jan. 16, 1912 |
| 1,630,309 | Pitman | May 31, 1927 |
| 1,734,310 | Taylor | Nov. 5, 1929 |
| 1,737,732 | Sauvage | Dec. 3, 1929 |
| 1,912,288 | Lundt et al. | May 30, 1933 |
| 1,983,386 | Mikeska | Dec. 4, 1934 |
| 1,996,349 | Ross | Apr. 2, 1935 |
| 2,022,512 | Macchi | Nov. 26, 1935 |
| 2,064,095 | Wilson | Dec. 15, 1936 |
| 2,182,735 | O'Dowd | Dec. 5, 1939 |
| 2,185,594 | Kittel | Jan. 2, 1940 |
| 2,251,111 | Brown | July 29, 1941 |
| 2,263,098 | Mueller | Nov. 18, 1941 |
| 2,290,742 | Elze | July 21, 1942 |
| 2,331,201 | Kumler | Oct. 5, 1943 |